United States Patent
Zait et al.

(10) Patent No.: US 10,292,088 B2
(45) Date of Patent: May 14, 2019

(54) BLOCKED DEVICE CHECKING IN ROAMING SCENARIOS

(71) Applicant: T-Mobile USA, Inc., Bellevue, WA (US)

(72) Inventors: Hichem Zait, Bellevue, WA (US); Nassereddine Sabeur, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/152,187

(22) Filed: Oct. 4, 2018

(65) Prior Publication Data

US 2019/0037476 A1     Jan. 31, 2019

Related U.S. Application Data

(63) Continuation of application No. 15/691,062, filed on Aug. 30, 2017, now Pat. No. 10,117,156, which is a
(Continued)

(51) Int. Cl.
*H04M 1/66* (2006.01)
*H04M 1/68* (2006.01)
(Continued)

(52) U.S. Cl.
CPC ............ *H04W 48/02* (2013.01); *H04M 15/66* (2013.01); *H04W 8/02* (2013.01); *H04W 8/22* (2013.01); *H04W 12/08* (2013.01)

(58) Field of Classification Search
USPC ................ 455/411, 410, 461, 435.1
See application file for complete search history.

(56) References Cited

U.S. PATENT DOCUMENTS

| 8,385,200 B2 | 2/2013 | Rainer et al. |
| 8,489,075 B2 | 7/2013 | Shaw |

(Continued)

FOREIGN PATENT DOCUMENTS

| JP | 2015532058 | 11/2015 |
| KR | 1020130129466 | 11/2013 |

OTHER PUBLICATIONS

Office Action for U.S. Appl. No. 15/691,062, dated Feb. 28, 2018, Zait, "Blocked Device Checking in Roaming Scenarios", 6 pages.
(Continued)

Primary Examiner — Marceau Milord
(74) Attorney, Agent, or Firm — Lee & Hayes, P.C.

(57) ABSTRACT

In certain cellular communication systems, a roaming communication device may attempt to establish a connection with a visited wireless communication network. Before allowing the connection, the visited network may check to see whether the International Mobile Equipment Identity (IMEI) of the device has been listed in an Equipment Identity Register (EIR) as being blocked, and may refuse the connection if the IMEI is listed as being blocked. In addition, when the home network of the device receives a request to authorize usage of the device, the home network may also check its own EIR to determine whether the IMEI has been blocked. If the IMEI has been blocked in the EIR of the home network, the home network indicates to the visited network that the connection should be refused.

20 Claims, 7 Drawing Sheets

Related U.S. Application Data continuation of application No. 15/396,051, filed on Dec. 30, 2016, now Pat. No. 9,763,168.

(60) Provisional application No. 62/402,540, filed on Sep. 30, 2016.

(51) Int. Cl.

| | | |
|---|---|---|
| *H04M 3/16* | (2006.01) | |
| *H04W 48/02* | (2009.01) | |
| *H04W 8/02* | (2009.01) | |
| *H04W 8/22* | (2009.01) | |
| *H04M 15/00* | (2006.01) | |
| *H04W 12/08* | (2009.01) | |

(56) References Cited

U.S. PATENT DOCUMENTS

| | | | |
|---|---|---|---|
| 8,537,797 B2 | 9/2013 | Narkar et al. | |
| 9,026,080 B2 | 5/2015 | Moran et al. | |
| 9,094,829 B2 | 7/2015 | Chen et al. | |
| 9,143,942 B2* | 9/2015 | Agarwal | H04W 12/06 |
| 9,271,251 B2 | 2/2016 | Narkar et al. | |
| 9,591,484 B2 | 3/2017 | Ionescu et al. | |
| 9,763,168 B1* | 9/2017 | Zait | H04W 48/02 |
| 9,794,905 B1* | 10/2017 | Chastain | H04W 4/70 |
| 9,814,010 B1* | 11/2017 | Chastain | H04W 4/70 |
| 9,820,251 B2 | 11/2017 | Narkar et al. | |
| 9,843,922 B1* | 12/2017 | Chastain | H04W 4/70 |
| 9,906,943 B1* | 2/2018 | Chastain | H04W 4/70 |
| 10,117,156 B2* | 10/2018 | Zait | H04W 48/02 |
| 10,187,783 B2* | 1/2019 | Chastain | H04W 8/183 |
| 10,187,865 B2* | 1/2019 | Chastain | H04W 12/06 |
| 2011/0122813 A1 | 5/2011 | Choe et al. | |
| 2011/0130117 A1 | 6/2011 | Fan et al. | |
| 2011/0130118 A1 | 6/2011 | Fan et al. | |
| 2012/0039312 A1 | 2/2012 | Narkar et al. | |
| 2012/0144226 A1 | 6/2012 | Yang et al. | |
| 2013/0101096 A1 | 4/2013 | Shaw | |
| 2013/0281058 A1 | 10/2013 | Obaidi et al. | |
| 2013/0294434 A1* | 11/2013 | Lee | H04W 8/005 370/338 |
| 2013/0295924 A1 | 11/2013 | Sutherns et al. | |
| 2016/0237216 A1 | 8/2016 | Konno et al. | |
| 2018/0077666 A1* | 3/2018 | Chastain | H04W 4/70 |

OTHER PUBLICATIONS

PCT Search Report and Written Opinion dated Jan. 29, 2018 for PCT Application No. PCT/US17/53789, 10 pages.

\* cited by examiner

BLOCKED DEVICE CHECKING IN ROAMING SCENARIOS

CROSS-REFERENCE TO RELATED APPLICATIONS

This is a continuation application which claims priority to commonly assigned, co-pending U.S. patent application Ser. No. 15/691,062, filed Aug. 30, 2017, which is a continuation of and claims priority to U.S. patent application Ser. No. 15/396,051, filed Dec. 30, 2016, now known as U.S. Pat. No. 9,763,168, issued on Sep. 12, 2017, which claims priority to and the benefit of, U.S. Provisional Patent Application Ser. No. 62/402,540, filed Sep. 30, 2016, entitled "IMEI CHECK IN ROAMING SCENARIOS", all of which are fully incorporated herein by reference.

BACKGROUND

Mobile communication devices are typically identified by unique identifiers known as IMEIs (International Mobile Equipment Identifiers). An IMEI is a 15-digit number that uniquely identifies a corresponding device when the device is used on a GSM (Global System for Mobile Communications) cellular communication network. Device manufacturers cooperate to ensure that no two devices have the same IMEI.

Each cellular communication operator maintains a database listing the IMEIs of devices that have been authorized for use on the communication network of the carrier. This database, known as an EIR (Equipment Identity Register), also indicates the IMEIs of any devices that should not be allowed to access the communication network. For example, IMEIs corresponding to devices that have been reported lost or stolen are marked as being blocked, and the devices are prevented from operating on the communication network. This discourages device theft, because stolen devices are unable to register for and obtain the services of the communication network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
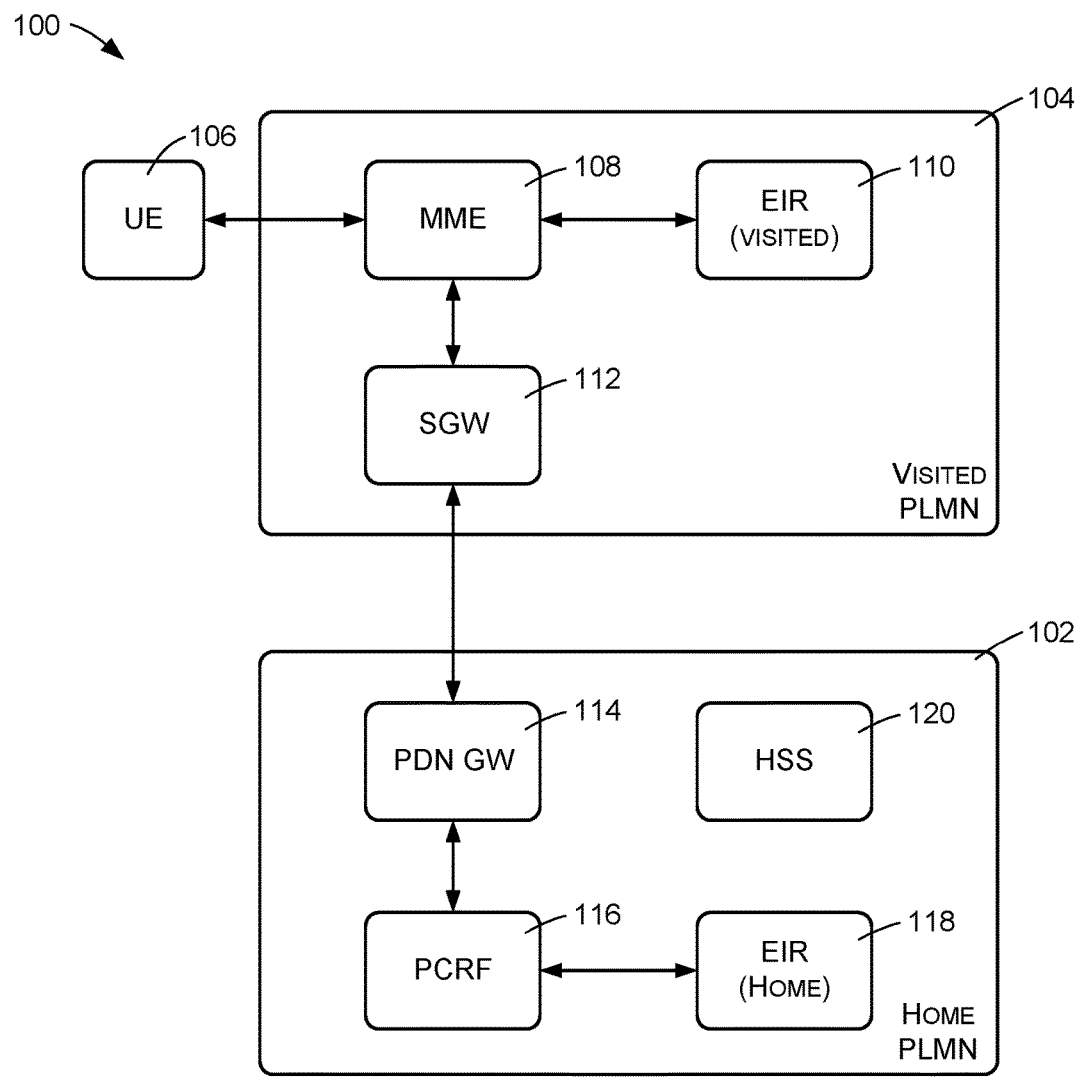
FIG. 1 is a block diagram showing a home network and a visited network of a wireless communications system, and also showing communication paths that may be used in one embodiment for Equipment Identity Register (EIR) checking.

Described herein are interfaces, techniques, and systems that may be used by operators of wireless telecommunication networks to block network access from devices having blocked IMEIs, particularly in roaming scenarios in which the devices are attempting to connect to visited networks.

A network user, referred to as a subscriber, is typically subscribed to the services of a particular wireless telecommunication network, which is referred to as the home network of that subscriber. When travelling outside the geographical coverage area of the home network, the subscriber may access communication services using other wireless telecommunication networks, which are referred to as visited networks with respect to the subscriber.

A subscriber is identified to a network by a subscriber identifier. The subscriber identifier typically comprises an IMSI (International Mobile Subscriber Identity), which is often stored on a SIM (Subscriber Identity Module) inserted into a communication device owned by the subscriber. When the device attempts to access a network, the device provides the IMSI so that the network can identify the services to which the user has subscribed.

Each device has a uniquely associated device identifier, which typically comprises what is known as an IMEI (International Mobile Equipment Identifier). An IMEI is a 15-digit number that uniquely identifies a corresponding device when the device is used on a Global System for Mobile Communications (GSM) communication network. A device provides the IMEI when attempting to access a GSM communication network.

When a device is roaming and requests connection to a visited network, the visited network communicates with the home network to determine whether the subscriber identified by the IMSI of the device is authorized by the home network, and if so, the qualities of services that the subscriber is authorized to access.

In certain situations, both the visited network and the home network may maintain respective EIRs. The EIR of a particular network is a database of IMEIs, in which certain IMEIs are indicated as being blocked. Blocked IMEIs correspond to devices that are to be denied non-emergency access to the network. When a communication device attempts to connect to a particular network, the network first checks its EIR. If the IMEI of the device is marked as blocked in the EIR, the communication device is not allowed to connect (except for emergency calls).

When a device is roaming and requests connection to a visited network, the visited network checks its EIR, referred to herein as the visited EIR, to determine whether the visited EIR includes the IMEI of the device and whether the IMEI is marked as being blocked. If so, the device is prevented from establishing a connection. If the IMEI is not listed as being blocked, the visited network communicates with the home network of the device subscriber to identify the services to which the subscriber is subscribed, based on the IMSI provided by the device. The visited network provides both the IMSI and the IMEI to the home network.

Upon receiving a request for authorization of a subscriber, identified by an IMSI, the home network checks its EIR, referred to as the home EIR, to determine whether the home EIR includes the IMEI of the device and whether the IMEI is marked as being blocked. If so, the home network indicates to the visited network that network access should not be allowed to the requesting device. If the IMEI is not listed as being blocked, the home network checks its subscriber databases based on the provided IMSI to determine the services to which the user has subscribed and the applicable parameters of those services, and provides this information to the visited network so that the requested communication session can proceed.

In an LTE (Long-Term Evolution) telecommunication network, the authorization process described above may be initiated when the mobile device sends an attach request to a visited network and provides a subscriber IMSI and device IMEI. An MME (Mobile Management Entity) of the visited network receives the attach request and sends a create session request to a SGW (Serving Gateway) of the visited network. The SGW forwards the create session request to a PDN GW (Packet Data Network Gateway) of the device subscriber's home network. Upon receiving the create session request, the PDN GW creates sends an authorization request to a PCRF (Policy and Charging Rules Function) of the home network to authorize network access by the mobile device. The authorization request includes the IMSI and the IMEI provided by the mobile device.

In response to receiving the authorization request, the PCRF queries the EIR of the home network to determine whether the IMEI of the mobile device has been blocked. If the IMEI is indicated as blocked in the EIR, the PCRF rejects the authorization request by returning an authorization response with the result code "IMEI Blocked". If the IMEI is not shown in the EIR as blocked, the PCRF accesses subscriber databases maintained by the home network to find subscriber information corresponding to the received IMSI and, depending on the nature of the subscriber information, returns an authorization response indicating to proceed with the requested session, and also indicating various parameters regarding services to which the subscriber is subscribed.

The PDN GW and the SGW then respond as appropriate to the MME of the visited network, indicating either that the requested session should be blocked, or specifying connection parameters for an allowed connection.

In an alternative embodiment, checking of the home EIR may be performed in response to the MME of the visited network sending an authentication request to an HSS (Home Subscriber Server) of the home network. In response to receiving the authentication request, the HSS queries the EIR of the home network to determine whether the IMEI of the mobile device has been blocked. If the IMEI is indicated as blocked in the EIR, the HSS returns an authentication response to the MME indicating that network access should be denied to the requesting communication device.

FIG. 1 shows an example cellular communication system 100 that includes a home PLMN (Public Land Mobile Network) 102 and a visited PLMN 104. Each of the PLMNs 102 and 104 may comprise a cellular communications network and infrastructure that is provided and maintained by a respective cellular communications network carrier or operator. In the described embodiments, each PLMN utilizes 4G (Fourth Generation) technology such as defined by the LTE (Long-Term Evolution) standard. Communication networks such as this are based on IP (Internet Protocol), packet-based protocols rather than on the circuit-switched protocols of previous generations of communication systems. Certain of the described techniques, however, may also be implemented in circuit-switched networks.

FIG. 1 shows the components of the home PLMN 102 and visited PLMN 104 that are relevant to the current discussion. In practice, each PLMN may have many other components and functional elements, in addition to those shown. Furthermore, FIG. 1 shows selected components of the home PLMN 102 that are most relevant to operation when the home PLMN 102 is in the role of a home network, and selected components of the visited PLMN 104 that are most relevant to operation of the system 100 when the visited PLMN 104 is in the role of a visited network.

In practice, the system 100 may have more than two PLMNs, each of which may act as either a home network or a visited network with respect to different mobile communication devices.

In the example of FIG. 1, user equipment (UE) 106 is shown as connecting to the visited PLMN 104. The UE 106 may comprise a mobile communication device such as a smartphone, or may comprise any other device having cellular or other wireless communication capabilities, such as tablet computers, wearable devices, controllers, entertainment devices, electronic book readers, and so forth. For purposes of this example and the examples that follow, it is assumed that the UE 106 is associated with a subscriber of the home PLMN 102.

In attempting to establish communications when roaming with the geographic service area of the visited PLMN 104, the UE 106 communicates with an MME (Mobile Management Entity) 108 of the visited PLMN 104. The MME 108 checks with a visited EIR 110 maintained by the visited PLMN 104 before allowing the UE 106 to connect to the visited PLMN 104.

If the IMEI of the UE 106 is not blocked in the visited EIR 110, an SGW (Serving Gateway) 112 of the visited PLMN 104 communicates with the home PLMN 102, through a PDN GW (Packet Data Network Gateway) 114, to determine from the home PLMN 102 whether the subscriber associated with the UE 106 is authorized for network access and if so, the types and parameters of services to which the subscriber has subscribed.

The PDN GW 114 interacts with a PCRF (Policy Charging Rules Function) 116 of the home PLMN 102 to authorize network access by the subscriber. As part of this interaction, the PCRF 116 checks an EIR 118 maintained by the home PLMN 102 to determine whether the IMEI of the UE 106 has been blocked by the home PLMN 102. If so, this result is returned to the PDN GW 114, which indicates to the visited PLMN 104 that the session requested by the UE 106 should be denied. Otherwise, the PCRF 116 accesses other databases within the home PLMN 102 to determine the nature and quality of services to which the subscriber associated with the UE 106 is entitled, and reports this information back to the visited MME 108 through the PDN GW 114 and the SGW 112.

Figure 2:
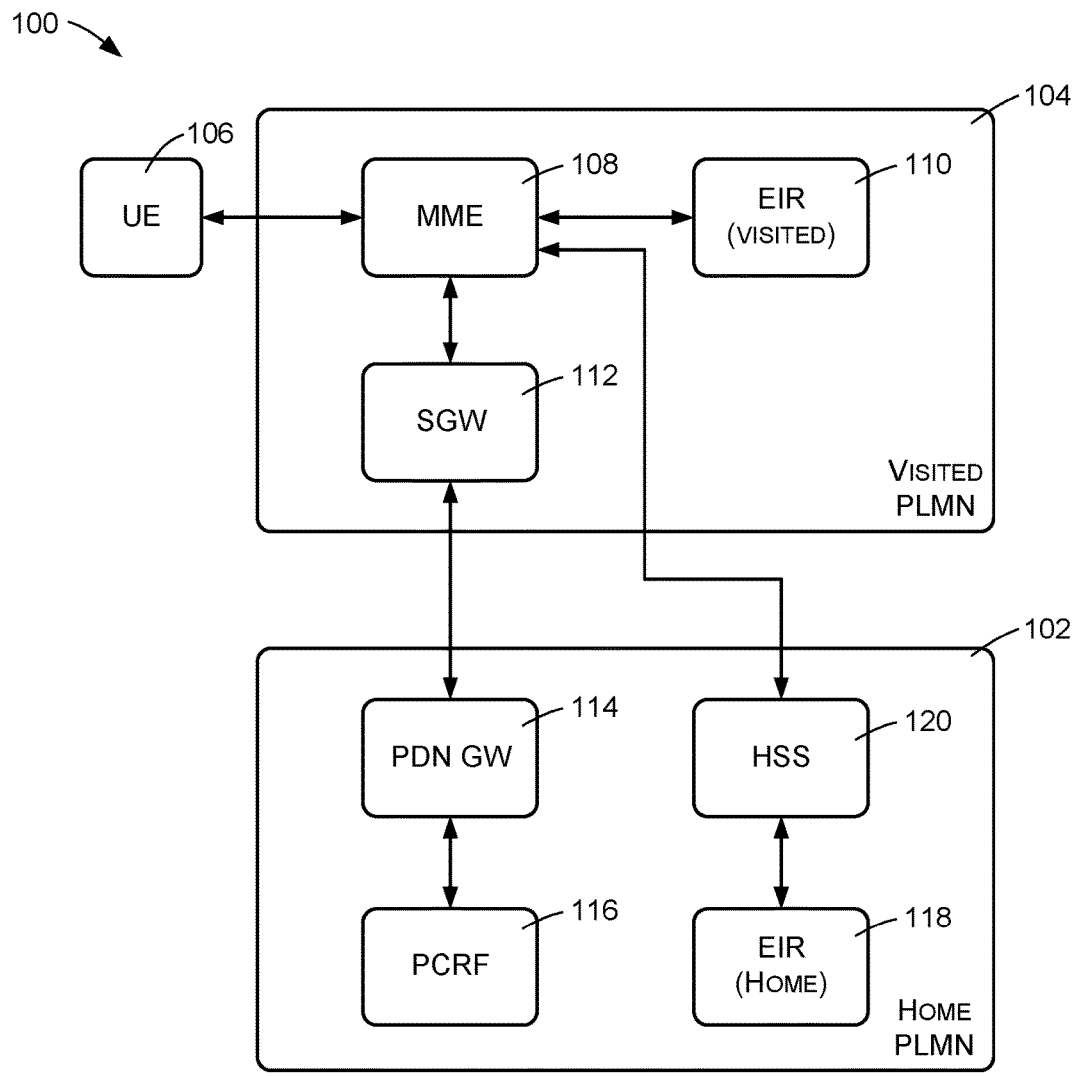
FIG. 2 is a block diagram showing the home network and the visited network, and also showing communication paths that may be used in another embodiment for EIR checking.

FIG. 2 shows the communication system 100, while illustrating an alternative technique for checking the IMEI of the UE 106 at the home PLMN 102. In this embodiment, the home EIR check occurs when the MME 108 of the visited PLMN 104 sends an authorization request to an HSS 120 of the home PLMN 102. Upon receiving the authorization request, the HSS 120 checks the home EIR 118 to determine whether the IMEI of the UE 106 has been blocked by the home PLMN 102. If so, the HSS 120 reports to the MME 108 that the session requested by the UE 106 should be denied. Otherwise, the HSS 120 accesses other databases within the home PLMN 102 to determine the nature and quality of services to which the subscriber associated with the UE 106 is entitled, and reports this information back to the visited MME 108.

Figure 3:
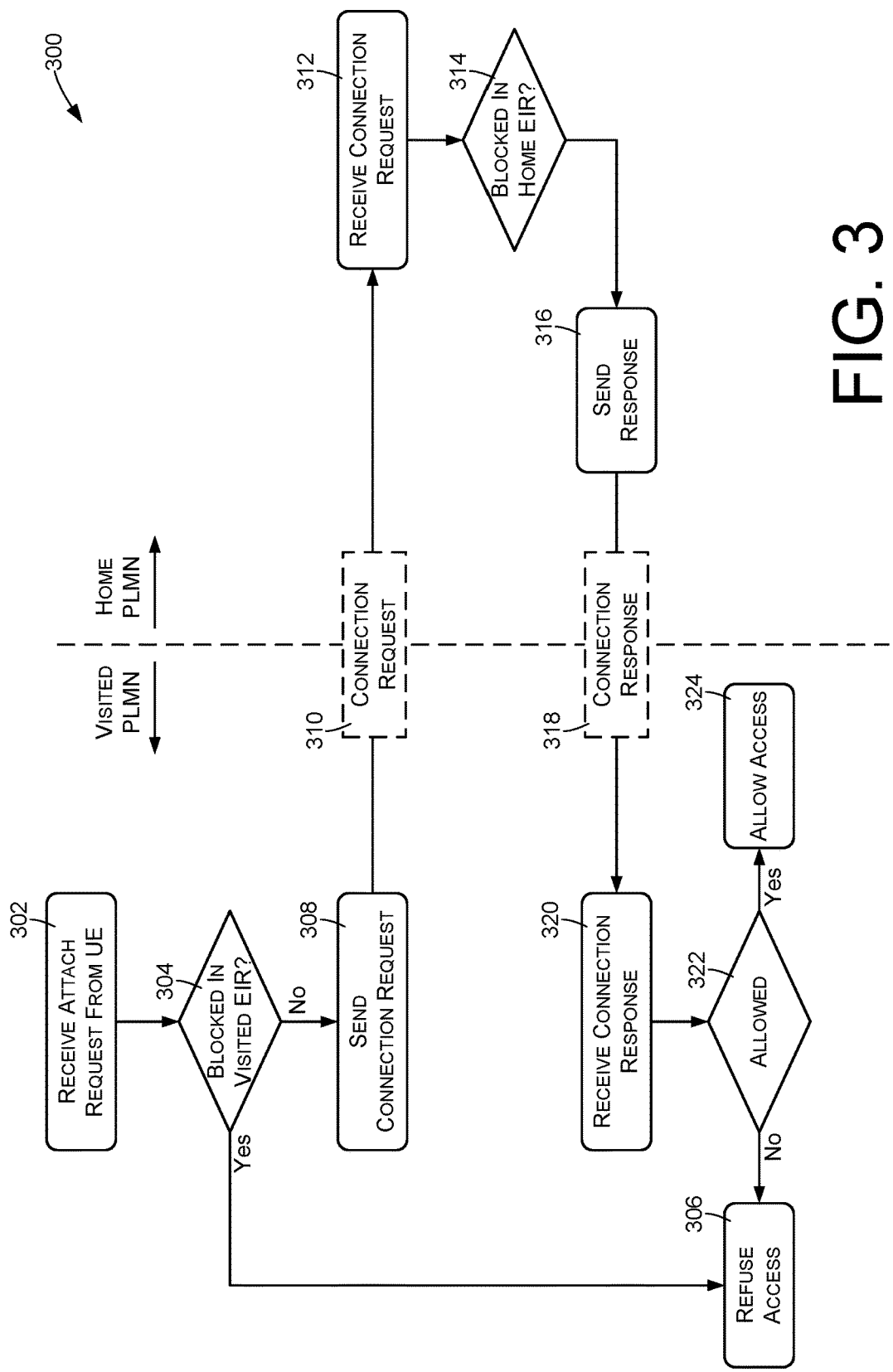
FIG. 3 is a flow diagram illustrating an example method of performing EIR checking by a home communication network in a roaming scenario.

FIG. 3 illustrates an example method 300 that may be performed when the UE 106 attempts to connect to the visited PLMN 104 in situations where the UE 106 is roaming and is within the geographical coverage area of the visited PLMN 104. Actions on the left of FIG. 3 are performed by one or more components of the visited PLMN 104. Actions on the right of FIG. 3 are performed by one or more components of the home PLMN 102.

An action 302 comprises receiving an initial attach request. In an LTE environment, for example, the UE 106 may send an attach request to an eNodeB base station. The eNodeB base station may then forward the attach request to the MME 108 of the visited network 104. The attach request specifies a subscriber identifier, which as discussed above is the IMSI of the subscriber with which the UE 106 is associated. The attach request also specifies the device identifier of the UE 106, which as discussed above is the device's IMEI.

An action 304, performed by the MME 108 of the visited network 104, comprises checking the visited EIR 110 to determine whether the IMEI of the UE 106 is indicated by the visited EIR 110 as being blocked. If the IMEI is indicated as being blocked, an action 306 is performed of refusing the attempt by the UE 106 to establish network access.

If the IMEI is not indicated as being blocked by the visited EIR 110, an action 308 is performed of sending a connection request 310 to the home PLMN 102, where the request 310 is a request to allow network access by the UE 106. The connection request 310 specifies the IMSI and the IMEI.

An action 312, performed by the home PLMN 102, comprises receiving the connection request 310.

In certain embodiments, the connection request 310 may comprise an authorization request sent from the MME 108 of the visited PLMN 104, which is handled by the PCRF 116 of the home PLMN 102. In other embodiments, the connection request 310 may comprise an authentication request sent from the MME 108 of the visited PLMN 104, which is handled by the HSS 120 of the home PLMN 102.

In response to receiving the connection request 310, the home PLMN 102 performs an action 314 of checking the home EIR 118 to determine whether the IMEI of the UE 106 is indicated by the home EIR 118 as being blocked. An action 316 comprises sending a connection response 318 back to the visited PLMN 104. If the IMEI is indicated as being blocked as determined in the action 314, the connection response 318 indicates that network access should be denied to the UE 106. Otherwise, if the IMEI is not indicated as being blocked by the home EIR 118, the connection response 318 indicates that the requesting UE 106 has been authorized and may be allowed network access. The connection response 318 in this case may also indicate service parameters of the subscriber associated with the UE 106, such as quality-of-service (QoS) and other parameters relating to types and qualities of services to which the subscriber has subscribed.

An action 320, performed by the visited PLMN 104, comprises receiving the connection response 318. An action 322 comprises determining whether the connection response 318 indicates that the UE 106 has been authorized for network access. If so, an action 324 is performed of allowing network access by the UE 106. This might involve further communications and setup procedures in accordance with applicable network protocols. If the connection response 318 indicates that the UE 106 has not been authorized for network access, the action 306 is performed of refusing network access to the UE 106.

Figure 4:
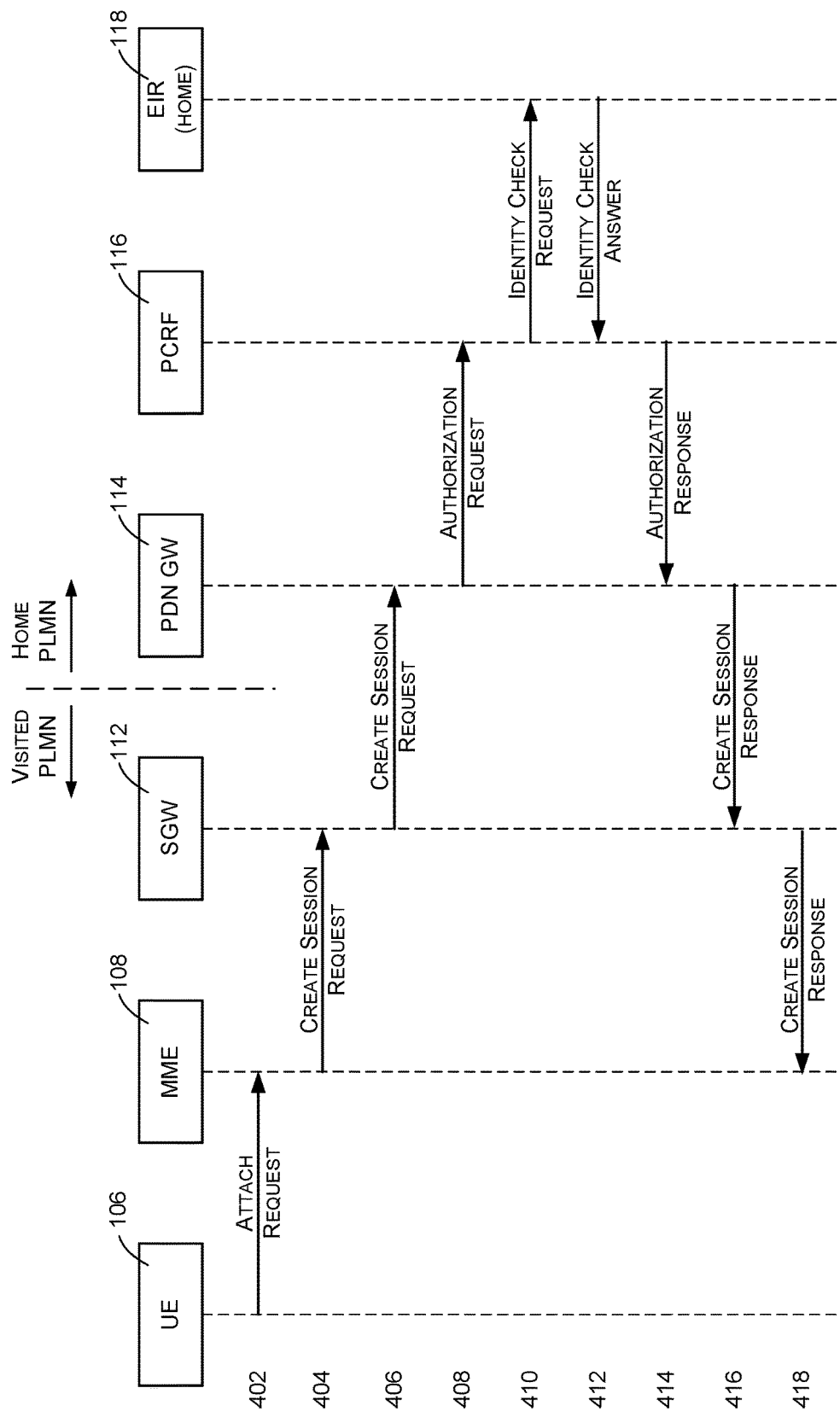
FIG. 4 is a communication sequence diagram illustrating an example communication sequence for performing EIR checking by a home communication network in a roaming scenario.

FIG. 4 illustrates further details regarding communications between the components shown in FIG. 1, in an embodiment in which the PCRF 116 of the home PLMN 102 performs home EIR checking. In FIG. 4, as well as in FIG. 6 which is discussed below, communicating components or entities are listed along the top, with a corresponding dashed vertical line extending downward. Communications are indicated by arrows that extend horizontally from and to the vertical lines corresponding to the entities from that originate and receive the communications. Communications occur in order from top to bottom. An individual communication or set of communications is indicated by a corresponding reference numeral along the left side of the figure, horizontally aligned with the arrow or arrows representing the communication.

Figure 6:
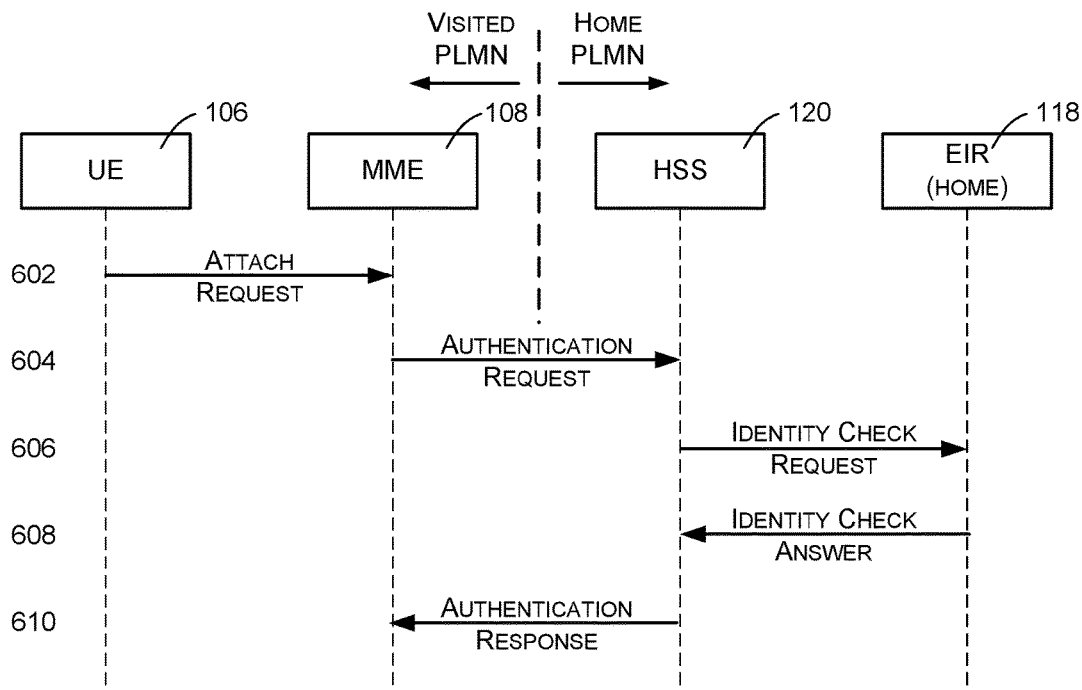
FIG. 6 is a communication sequence diagram illustrating another example communication sequence for performing EIR checking by a home communication network in a roaming scenario.

Note that FIGS. 4 and 6 illustrate the most relevant communications and may omit other communications that occur in practice but are less relevant to the topics at hand. Such other communications may include communications that both precede and follow the illustrated communications, communications that occur in time between the illustrated communications, and communications that occur between components or entities that are not specifically shown. Additional details regarding various aspects of processing initial attach requests in this environment are defined by TS 29.272 of the 3rd Generation Partnership Project (3GPP).

At 402, the UE 106 sends an attach request, which is received by the MME 108 of the visited PLMN 104. The attach request includes, among other information, the IMEI of the UE 106 and the IMSI of the subscriber associated with the UE 106.

In response to receiving the attach request, at 404 the MME 108 sends a create session request that is received by the SGW 112 of the visited PLMN 104. An example format for a create session request is specified by 3GPP TS 29.274. The create session request includes, among other information, the IMEI of the UE 106 and the IMSI of the device subscriber.

At 406, the SGW 112 forwards the create session request to the PDN GW 114 of the home PLMN 102, again including the IMEI of the UE 106 and the IMSI of the device subscriber.

At 408, the PDN GW 114 sends an authorization request to the PCRF 116 of the home PLMN 102, again including the IMEI of the UE 106 and the IMSI of the device subscriber. In certain embodiments, the authorization request may comprise a Credit Control Request (CCR) Initialization message as specified by 3GPP TS 29.212.

In response to receiving the authorization request, at 410 the PCRF queries the home EIR 118 to determine whether the EMEI of the UE 106 is indicated as blocked. This query can be performed over a 3GGP S13h interface as defined by 3GGP TS 29.272, where the query is referred to as an identity check request. At 412, the EIR 118 provides an identity check answer, again over the 3GGP S13h interface. At 414, the PCRF provides an authorization response to the PDN GW 114. The authorization response indicates whether or not the UE 106 is authorized for network access.

The authorization response is based partly on the result of the identity check request with the EIR 118. If the identity check request indicates that the IMEI of the UE 106 is blocked, the authorization response indicates an experimental result code "IMEI blocked," indicating that network access should not be allowed to the UE 106. If the identity check request does not indicate that the IMEI is blocked, the PCRF performs other inquiries based on the IMSI of the device subscriber to determine which services should be provided to the UE 106, as well as various parameters regarding the quality levels of those services, such as quality-of-service (QoS) parameters. This information is returned as part of the authorization response in cases where the IMEI is not blocked.

At 416, the PDN GW 114 sends a create session response to the SGW 112 of the visited PLMN 104. The create session response reflects the content of the authorization response from the PCRF, and may at times indicate that network access should be denied based on the IMEI of the UE 106 being blocked. In cases where the IMEI is not blocked, the create session response indicates the levels of services to which the UE 106 is entitled.

At 418, the SGW 112 forwards the create session response to the MME 108 of the visited network. The MME 108 then proceeds with processing the attach request, depending on the information specified by the create session response.

Figure 5:
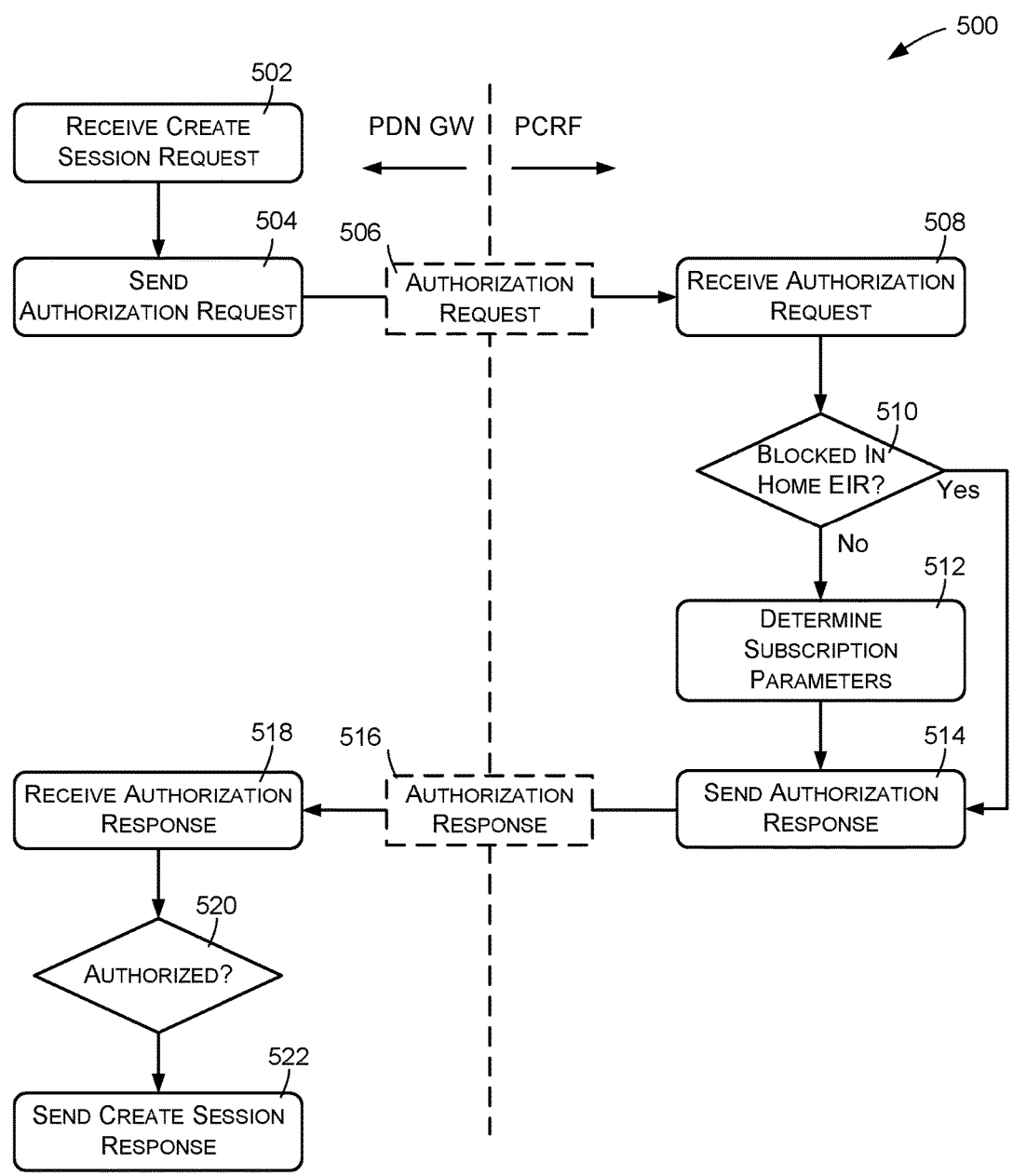
FIG. 5 is a flow diagram illustrating another example method of performing EIR checking by a home communication network in a roaming scenario.

FIG. 5 shows an example method 500, corresponding to the call flow of FIG. 4, showing actions that may be performed within the home PLMN 102 in an embodiment in which the PCRF 116 of the home PLMN 102 provides EIR checking for roaming subscribers. In this embodiment, the actions on the left side of FIG. 5 are performed by the PDN GW 114 of the home PLMN. The actions on the right side of FIG. 5 are performed by the PCRF 116 of the home PLMN.

An action 502, performed by the PDN GW 114, comprises receiving a create session request. In the described embodiments, the create session request may be initiated by the MME 108 of the visited network and forwarded through the SGW 112 of the home network to the PDN GW 114. The create session request specifies an IMSI and an IMEI.

An action 504 comprises, in response to receiving the request, requesting authorization from the PCRF 116 of the home PLMN 102 based at least in part on the subscriber identifier and the IMSI. In certain embodiments, this may comprise sending an authorization request 506 from the PDN GW 114 to the PCRF 116 of the home PLMN 102. The authorization request 506 specifies the subscriber identifier and the device identifier.

An action 508, performed by the PCRF 116, comprises receiving the authorization request 506.

An action 510, performed by the PCRF 116 of the home PLMN 102, comprises determining whether the IMEI is specified as blocked within the EIR 118 of the home PLMN 102. The action 510 may comprise querying the EIR 118 based at least in part on the IMEI. In certain embodiments, the querying may be performed using the S13h' mobile equipment identity check procedure specified by 3GPP TS 29.272.

If the device identifier is not indicated as being blocked in the home EIR 118, an action 512 is performed of determining one or more subscription parameters of the subscriber based at least in part on the subscriber identifier.

An action 514 is then performed of sending an authorization response 516 to the PDN GW 114. If in the action 510 it has been determined that the device identifier is not specified as blocked within the home EIR 118, the action 514 comprises returning the one or more subscription parameters in the authorization response 516. However, if in the action 510 it has been determined that the device identifier is specified as blocked within the home EIR 118, the action 514 comprises indicating in the authorization response that network access by the UE 106 is not authorized. In certain embodiment, this may comprise indicating "IMEI Blocked" as an experimental result code in the authorization response.

An action 518, performed by the PDN GW 114, comprises receiving the authorization response 516. An action 520 comprises determining whether the authorization response 516 indicates that the requesting UE 106 is authorized for network access. An action 522 comprises sending or returning a create session response from the PDN GW 114 to the visited PLMN 104. If the authorization response 516 indicates that network access should be denied, the create session response indicates that network access by the communication device is not authorized. Otherwise, if the authorization response 516 indicates that network access should be allowed, the create session response indicates that network access is authorized.

FIG. 6 illustrates further detail regarding communications between the components shown in FIGS. 1 and 2, in an embodiment in which the HSS 120 of the home PLMN 102 performs home EIR checking.

At 602, the UE 106 sends an attach request, which is received by the MME 108 of the visited PLMN 104. The attach request includes, among other information, the IMEI of the UE 106 and the IMSI of the subscriber associated with the UE 106.

In response to receiving the attach request, at 604 the MME 108 sends an authentication request that is received by the HSS 120 of the home PLMN 102. In certain embodiments, the authentication request may comprise an Authentication Information Request (AIR) as used in the S6a communications interface of the Diameter messaging protocol. The authentication request includes, among other information, the IMEI of the UE 106 and the IMSI of the device subscriber.

In response to receiving the authentication request, at 606 the HSS 120 queries the home EIR 118 to determine whether the EMEI of the UE 106 is indicated as blocked. This query can be performed using the S13h mobile equipment identity check procedure specified by 3GPP TS 29.272. At 608, the EIR 118 provides an identity check answer, again over the 3GGP S13h interface. At 610, the HSS 120 provides an authentication response to the MME 108. The authentication response indicates whether or not the UE 106 is authorized for network access. In certain embodiments, the authentication response may comprise an Authentication Information Answer (AIA) as used in the S6a communications interface of the Diameter messaging protocol.

The authentication response is based partly on the result of the identity check request with the EIR 118. If the identity check request indicates that the IMEI of the UE 106 is blocked, the authentication response indicates that network access should not be allowed to the UE 106. If the identity check request does not indicate that the IMEI is blocked, the HSS 120 performs other inquiries based on the IMSI of the device subscriber to determine which services should be provided to the UE 106, as well as various parameters regarding the quality levels of those services, such as quality-of-service (QoS) parameters. This information is returned as part of the authentication response in cases there the IMEI is not blocked.

Figure 7:
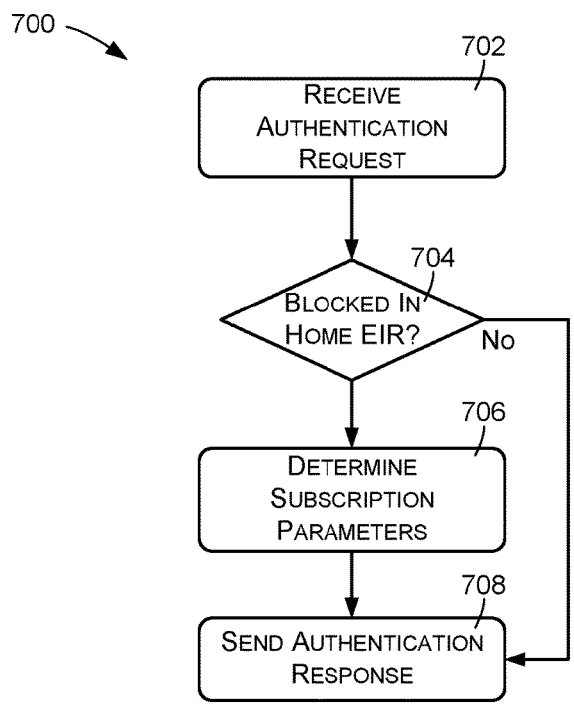
FIG. 7 is a flow diagram illustrating another example method of performing EIR checking by a home communication network in a roaming scenario.

FIG. 7 shows an example method 700, corresponding to the call flow of FIG. 6, showing actions that may be performed within the home PLMN 102 in an embodiment in which the HSS 120 of the home PLMN 102 provides EIR checking for roaming subscribers.

An action 702, performed by the PDN GW 114, comprises receiving an authentication request, which as mentioned above may comprise an S6a AIR. In the described embodiments, the create session request may be initiated by the MME 108 of the visited network and forwarded to the HSS 120. The authentication request specifies a subscriber identifier and a device identifier.

An action 704 comprises, in response to receiving the authentication request, determining whether the device identifier is specified as blocked within the EIR 118 of the home PLMN 102. The action 704 may comprise querying the EIR 118 based at least in part on the device identifier. In certain embodiments, the querying may be performed using the S13h mobile equipment identity check procedure specified by 3GGP TS 29.272.

If the device identifier is not indicated as being blocked in the home EIR 118, an action 706 is performed of determining one or more subscription parameters of the subscriber based at least in part on the subscriber identifier.

An action 708 is then performed of sending an authentication response to the PDN GW 114. As mentioned above, the authentication may comprise an S6a AIA. If in the action 704 it has been determined that the device identifier is not specified as blocked within the home EIR 118, the action 708 includes returning the one or more subscription parameters in the authentication response. However, if in the action 704 it has been determined that the device identifier is specified as blocked within the home EIR 118, the action 708 comprises indicating in the authorization response that network access by the UE 106 is not authorized.

Figure 8:
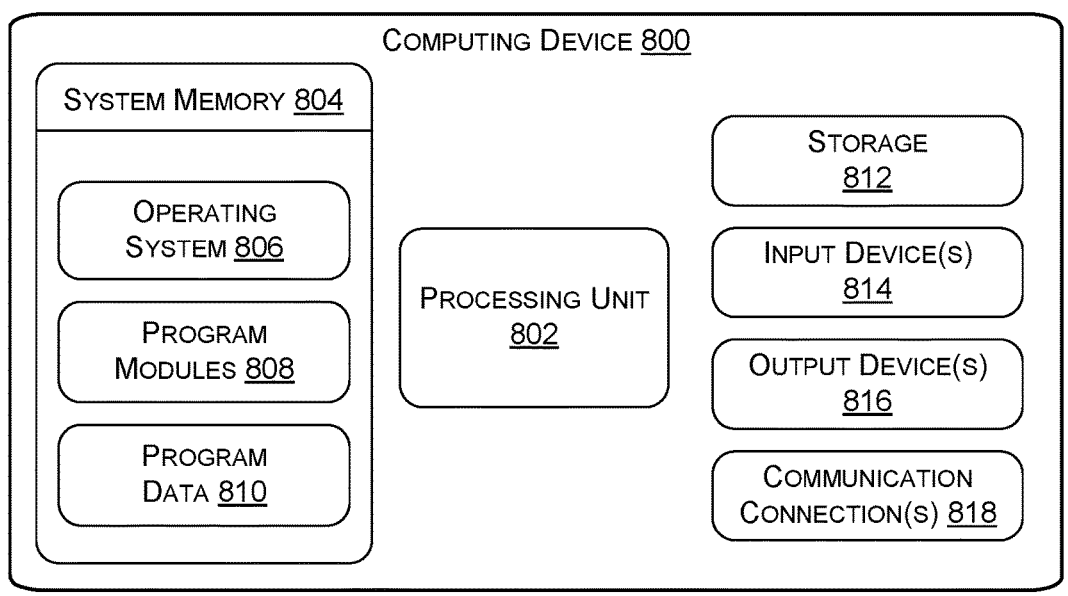
FIG. 8 is a block diagram of an example computing device that may be configured to implement various functionality of a wireless communications network.

FIG. 8 is a block diagram of an illustrative computing device 800 such as may be used to implement various components discussed above, such as elements of the home PLMN 102 and the visited PLMN 104. For example, one or more computing devices 800 may be configured or programmed to implement all or part of any one of the MME 108, the EIR 110, the SGW 112, the PDN GW 114, the PCRF 116, the EIR 118, and/or the HSS 120, as well as other components of the PLMNs that are not specifically shown or discussed.

In various embodiments, the computing device 800 may include at least one processing unit 802 and system memory 804. Depending on the exact configuration and type of computing device, the system memory 804 may be volatile (such as RAM), non-volatile (such as ROM, flash memory, etc.) or some combination of the two. The system memory 804 may include an operating system 806, one or more program modules 808, and may include program data 810.

The computing device 800 may also include additional data storage devices (removable and/or non-removable) such as, for example, magnetic disks, optical disks, or tape. Such additional storage is illustrated in FIG. 8 by storage 812.

Non-transitory computer storage media of the computing device 800 may include volatile and nonvolatile, removable and non-removable media implemented in any method or technology for storage of information, such as computer readable instructions, data structures, program modules, or other data. The system memory 804 and storage 812 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such non-transitory computer-readable storage media may be part of the computing device 800.

In various embodiment, any or all of the system memory 804 and storage 812 may store programming instructions which, when executed, implement some or all of the function functionality described above as being implemented by components of the visited PLMN 102 or the home PLMN 102.

The computing device 800 may also have input device(s) 814 such as a keyboard, a mouse, a touch-sensitive display, voice input device, etc. Output device(s) 816 such as a display, speakers, a printer, etc. may also be included. The computing device 800 may also contain communication connections 818 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A method, comprising:

receiving, by a visited wireless telecommunication network from a communication device, an attach request specifying a device identifier of the communication device;

determining, by the visited wireless telecommunication network, that the device identifier is not marked as blocked within a first database of device identifiers maintained by the visited wireless telecommunication network;

sending, by the visited wireless telecommunication network to a home wireless telecommunication network associated with the communication device, a connection request specifying the device identifier;

receiving, by the visited wireless telecommunication network from the home wireless telecommunication network, a connection response that indicates whether or not the device identifier is marked as blocked within a second database of device identifiers maintained by the home wireless telecommunication network; and blocking or granting access to the visited wireless telecommunication network for the communication device based at least in part on the connection response.

2. The method of claim 1, further comprising:

receiving, by the visited wireless telecommunication network, a subscriber identifier in the attach request from the communication device;

sending, by the visited wireless telecommunication network to the home wireless telecommunication network, the subscriber identifier; and receiving, by the visited wireless telecommunication network from the home wireless network when the device identifier is not marked as blocked within the second database of device identifiers, service parameters indicating services to which a subscriber associated with the subscriber identifier has subscribed.

3. The method of claim 2, wherein the service parameters include quality-of-service (QoS) parameters associated with the services.

4. The method of claim 2, wherein the service parameters are included in the connection response.

5. The method of claim 2, wherein the subscriber identifier is an International Mobile Subscriber Identity.

6. The method of claim 1, wherein the device identifier is an International Mobile Equipment Identifier.

7. The method of claim 1, wherein the connection request is a create session request sent from a Mobile Management Entity (MME) of the visited wireless telecommunication network to a Packet Data Network Gateway (PDN GW) of the home wireless telecommunication network via a Serving Gateway (SGW) of the visited wireless telecommunication network.

8. The method of claim 1, wherein the connection request is an authentication request sent from a Mobile Management Entity (MME) of the visited wireless telecommunication network to a Home Subscriber Server (HSS) of the home wireless telecommunication network.

9. The method of claim 8, wherein the authentication request is sent between the MME and the HSS using a Diameter messaging protocol.

10. The method of claim 1, wherein the attach request is received from the communication device by a base station of the visited wireless telecommunication network and is forwarded by the base station to a Mobile Management Entity of the visited wireless telecommunication network.

11. A visited wireless telecommunication network comprising:
   one or more processors;
   one or more non-transitory computer-readable media storing a first database of device identifiers that are marked as blocked and computer-executable instructions that, when executed by the one or more processors, cause the visited wireless telecommunication network to perform actions comprising:
      receiving an attach request from a communication device, the attach request specifying a device identifier of the communication device;
      determining that the device identifier is not marked as blocked in the first database;
      sending a connection request specifying the device identifier to a home wireless telecommunication network associated with the communication device;
      receiving, from the home wireless telecommunication network, a connection response that indicates whether or not the device identifier is marked as blocked within a second database of device identifiers maintained by the home wireless telecommunication network; and
      blocking or granting access to the visited wireless telecommunication network for the communication device based at least in part on the connection response.

12. The visited wireless telecommunication network of claim 11, wherein the actions further comprise:
   receiving a subscriber identifier in the attach request from the communication device;
   sending the subscriber identifier to the home wireless telecommunication network; and
   receiving, from the home wireless network when the device identifier is not marked as blocked within the second database of device identifiers, service parameters indicating services to which a subscriber associated with the subscriber identifier has subscribed.

13. The visited wireless telecommunication network of claim 11, wherein the connection request is a create session request sent to a Packet Data Network Gateway (PDN GW) of the home wireless telecommunication network.

14. The visited wireless telecommunication network of claim 11, wherein the connection request is an authentication request sent to a Home Subscriber Server (HSS) of the home wireless telecommunication network.

15. The visited wireless telecommunication network of claim 14, wherein the authentication request is sent between a Mobile Management Entity (MME) of the visited wireless telecommunication network and the HSS using a Diameter messaging protocol.

16. A Mobile Management Entity (MME) of a visited wireless telecommunication network, comprising:
   one or more processors;
   one or more non-transitory computer-readable media storing computer-executable instructions that, when executed by the one or more processors, cause the MME to perform actions comprising:
      receiving an attach request from a communication device, the attach request specifying a device identifier of the communication device;
      determining that the device identifier is not marked as blocked in the first database within a first database of device identifiers maintained by the visited wireless telecommunication network;
      sending a connection request specifying the device identifier to a home wireless telecommunication network associated with the communication device;
      receiving, from the home wireless telecommunication network, a connection response that indicates whether or not the device identifier is marked as blocked within a second database of device identifiers maintained by the home wireless telecommunication network; and
      blocking or granting access to the visited wireless telecommunication network for the communication device based at least in part on the connection response.

17. The MME of claim 16, wherein the actions further comprise:
   receiving a subscriber identifier in the attach request from the communication device;
   sending the subscriber identifier to the home wireless telecommunication network; and
   receiving, from the home wireless network when the device identifier is not marked as blocked within the second database of device identifiers, service parameters indicating services to which a subscriber associated with the subscriber identifier has subscribed.

18. The MME of claim 16, wherein the connection request is a create session request sent by the MME to a Packet Data Network Gateway (PDN GW) of the home wireless telecommunication network.

19. The MME of claim 16, wherein the connection request is an authentication request sent by the MME to a Home Subscriber Server (HSS) of the home wireless telecommunication network.

20. The MME of claim 19, wherein the authentication request is sent between the MME the HSS using a Diameter messaging protocol.

* * * * *